Sept. 1, 1953  W. J. JACOBSSON ET AL  2,650,455
GAS PRESSURE REGULATOR RESISTANT TO HUM
Filed Feb. 17, 1948  2 Sheets-Sheet 1

INVENTORS
WILGOT J. JACOBSSON
EDWARD BEHNKE
BY
ATTORNEY

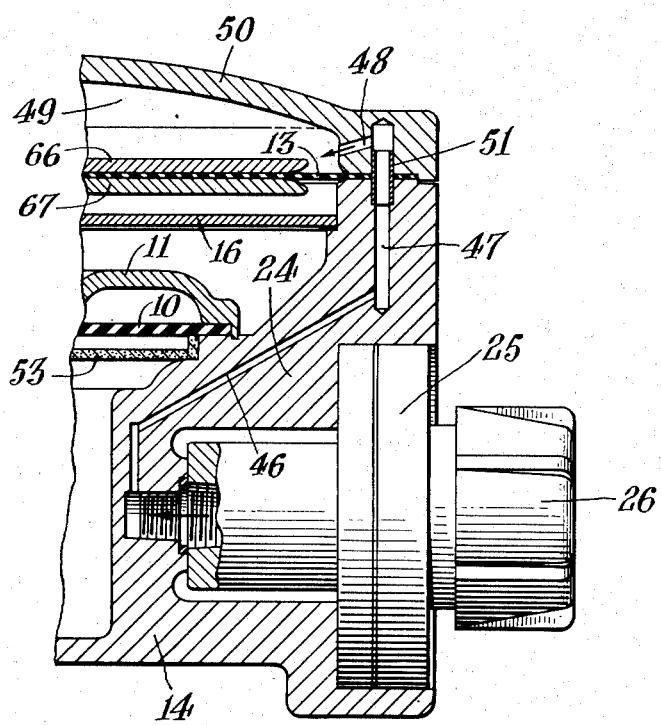
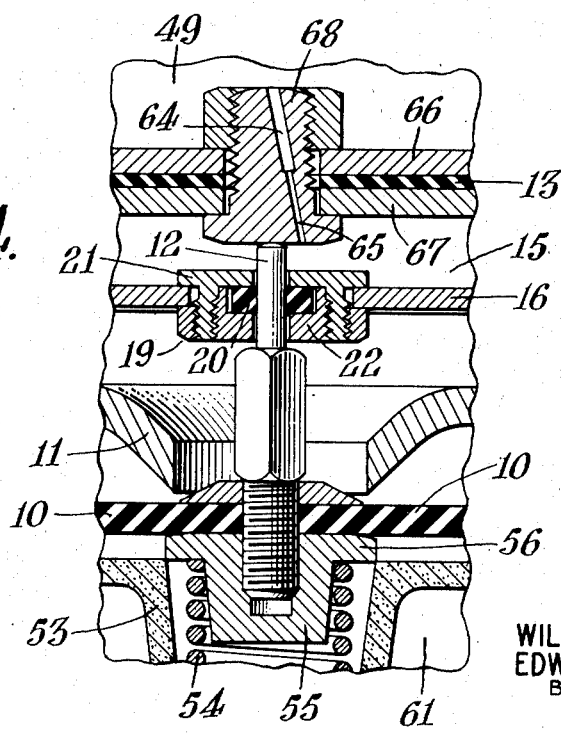

Patented Sept. 1, 1953

2,650,455

UNITED STATES PATENT OFFICE 2,650,455

GAS PRESSURE REGULATOR RESISTANT TO HUM

Wilgot J. Jacobsson, Plainfield, and Edward Behnke, Newark, N. J., assignors, by mesne assignments, to Union Carbide and Carbon Corporation, a corporation of New York Application February 17, 1948, Serial No. 8,847

10 Claims. (Cl. 50—21)

This invention relates to a gas pressure regulator and has for an object to eliminate the hum of the regulator valve without resort to the frictional type hum eliminator heretofore used with impairment in sensitivity. Another object is to provide a sensitive gas pressure regulator.

Hum in a diaphragm actuated gas pressure reducting valve is objectionable because of the rapid wear it causes on the valve seat which is usually of a yieldable material. A common expedient for elimination of hum has been the provision of a frictional brake upon longitudinal movement of the valve stem or diaphragm. In some valves there is enough friction in valve stem guide bearings to remove any tendency to hum. However, in certain self-aligning valves, for instance of the type described and claimed in the prior application of W. J. Jacobsson, Serial No. 700,692, filed October 2, 1946, for Fluid Pressure Regulator now Patent Number 2,612,728, dated October 7, 1952, the valve stem is guided principally by a flexible perforate diaphragm seat and since the valve stem is without any usual guide bearings hum may be troublesome. Also since the danger of hum generally increases with an increase in the volume of gas being passed, in a regulator for a large quantity of gas passing through it the danger of hum is great.

According to this invention hum has been eliminated without resort to mechanical friction by using a slight gas cushioning effect to suppress vibration. In the absence of frictional drag a regulator may be more sensitive.

Specifically, a baffle plate gastightly sealed around its edge and generally parallel to a pressure responsive diaphragm is located between such diaphragm and the self-aligning valve to provide a small gas chamber having enough of a constriction for the escape of gas so that on a slight increase of pressure due to flexure of the main diaphragm enough of a cushioning or checking action results to damp rapid vibrations of the main diaphragm and eliminate hum. More particularly, such constricted passage for gas movement from the chamber described is provided where the valve stem passes through the baffle plate. Merely enlarging the clearance between the stem and baffle plate opening is not sufficient because the self-aligning seat might cause the stem to tilt slightly, when objectionable mechanical friction of the stem against a side of the plate opening would result. Instead, a flexible packing is provided that is capable of lateral shifting with minimum friction in a stuffing box housing for the packing.

For purposes of illustration the invention has been shown embodied in a regulator of the pilot control type.

Referring to the drawings:

Fig. 3 is a section on the line 3—3 of Fig. 1;

Fig. 4 is an enlarged section of portions of the apparatus shown in Fig. 2.

Figure 2:
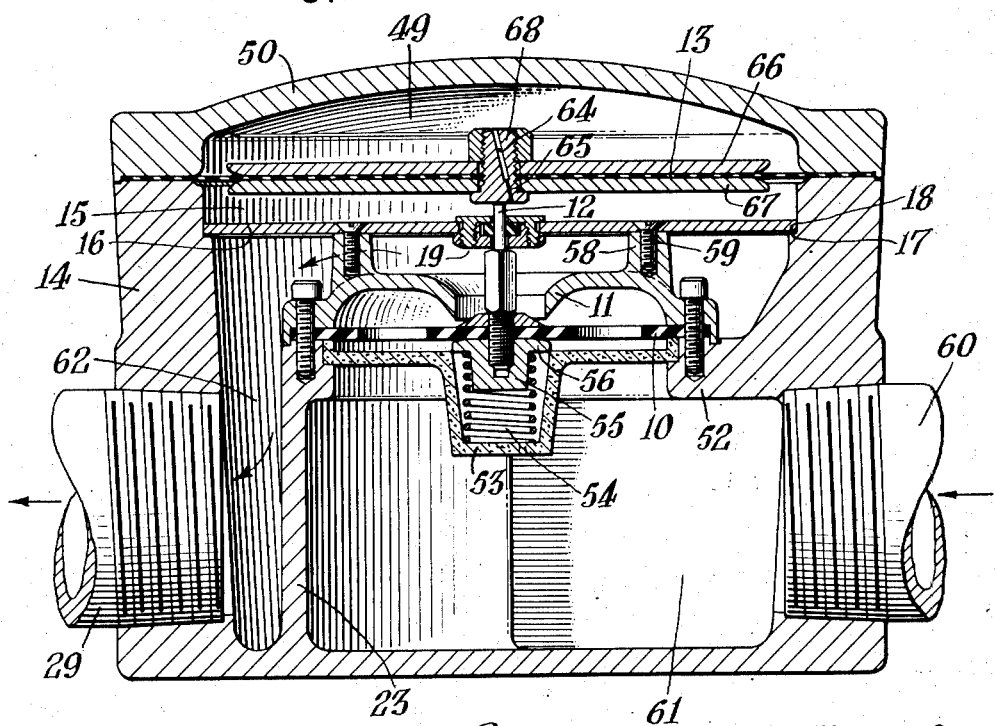
Fig. 2 is a section on the line 2—2 of Fig. 1.

As shown in Figs. 2 and 4 a self-aligning valve is provided with a perforate flexible diaphragm seat 10 engaging a stationary nozzle 11 and guiding a valve stem 12 cooperating with a pressure responsive diaphragm 13 in the casing or housing 14 for the regulator. A slight gas cushion is formed in a chamber 15 one wall of which is formed by the diaphragm 13. The opposite wall of this chamber is formed by a baffle plate 16 gastightly sealed around its edge to the housing 14 with the aid of a gasket 17 between the baffle plate 16 and a ledge 18 formed in the housing and to which said baffle plate is cemented. As may be seen in Fig. 4 a housing 19 is provided with packing 20 where the valve stem 12 passes through the baffle plate 16. The housing is preferably of the form illustrated such that when its inner and outer portions are screwed together it clamps the baffle plate 16 but does not clamp the packing 20. This packing 20 is preferably a flexible washer of polyethylene or polytetrafluoroethylene resins since these materials have a smooth surface adapted to provide little or no friction when the washer and stem is shifted laterally a small amount as might be necessary with a self-aligning valve seat 10. With proper clearances a polished metal washer of brass or other material may be used.

Opposite walls 21 and 22 of the housing are made with polished surfaces adjacent the washer 20 and should provide no more clearance between the packing of such opposite surface than is provided between the valve stem and the washer perforation through which the stem passes. In practice the stem is from .125" to .128" in diameter and the hole in the washer 20 is .130" to .140" in diameter. Thus a clearance of 5 to 10 thousandths of an inch has been found suitable to provide the desired constriction for gas movement between the stem and washer or across the faces of the washer and along its edge, to provide the cushioning action on diaphragm movement necessary to eliminate hum.

Figure 1:
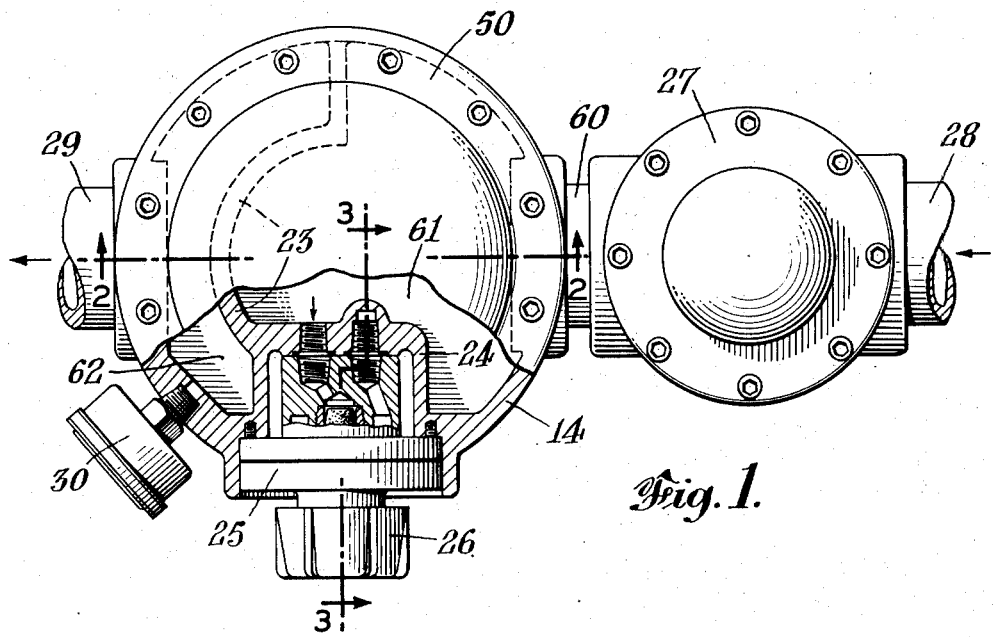
Fig. 1 is a top plan view of a main regulator embodying this invention.

As shown in Fig. 1 the regulator housing 14 is of usual cylindrical shape and of larger diameter than its axial length. An arcuate wall 23 within the housing separates the inlet and outlet chambers. An enlarged wall portion 24 is provided therein with a pilot regulator 25 having a handle 26 projecting out of the housing 14 in order that pressure of a pilot diaphragm therein and therefore pressure of the outlet gas from the regulator may be controlled and varied. A breaker regulator 27 is provided with an inlet pipe 28 leading to a source of gas pressure. The outlet from the breaker or regulator 27 leads into the main regulator housing 14. The outlet 29 is from the main regulator. A pressure gauge 30 indicating the outlet pressure is located adjacent the adjusting handle 26 in order that the gauge may indicate the degree of adjustment given the handle 26 by indicating the outlet pressure.

The outlet passage 46 from the pilot regulator passes through the housing of the main regulator as shown in Fig. 3. From the inclined passage 46 the outlet pressure fluid is transmitted through the passages 47 and 48 into a chamber 49 between the pressure responsive diaphragm 13 of the main regulator and a cover 50 secured thereto by Allen head bolts or the like. Where the passage 47 leaves the side walls of the housing 14 and enters the cover 50 a sleeve 51 is cemented in place to reduce the likelihood of leakage occurring around the diaphragm 13 or cover 50.

From Fig. 2 it may be seen that a side wall of the housing 14 is provided with an inwardly extending flange 52. The arcuate wall 23 and this flange 52 support the filter cup 53 which is of the general type disclosed in said aforementioned Patent No. 2,612,728, although here the filter cup is of a different shape. The valve closing spring 54 is located within the filter cup and cooperates with the spring centering block 55 contiguous the flexible diaphragm seat 10. A flange 56 on this block 55 may abut a wall of the filter to limit opening of the valve to a predetermined amount if desired or this flange 56 may be of smaller diameter to clear the inside of the cup and not limit valve opening movement in the aforementioned manner. A plurality of spaced upstanding posts 58 are formed on the nozzle member 11 in order that screws 59 may retain the baffle plate 16 supported on the posts 58 as well as around its edge. The inlet pipe 60 leads into an inlet chamber 61 so that the gas may pass through the filter 53, through perforations in the seat diaphragm 10 and between the seat 10 and nozzle 11 when the valve is opened, after which it flows through the nozzle 11 around the stem 12 and out between the posts 58 into the outlet chamber 62 and through the outlet pipe 29.

The diaphragm 13 of the main regulator is provided with a usual bleeder passage 64, the lower end of which is provided with a constriction as is customary in pilot operated valves. As shown in Fig. 4 the bleeder passage and its constriction are in the bolt 68 which clamps the plates 66 and 67 contiguous the diaphragm 13. The bleeder passage constriction is .033" in diameter and provides the maximum constriction necessary for operation of the pilot pressure regulator. As also described the size for the gas passage from or around the packing washer 20 is not less than in the maximum constriction 65 so that gas pressure within the chamber 15 between the diaphragm 13 and baffle plate 16 is substantially that of the outlet pressure although of course very slightly above it due to the cushioning action of the chamber 15 as already described.

The use of the baffle plate 16 to provide a gas cushioning chamber 15 for elimination of hum is not limited to regulators of the pilot control type and the same construction illustrated in Figs. 2 and 4 may be used in other types of regulators such as those where a spring presses against the diaphragm 13 instead of gas pressure. Of course when no pilot control type regulator is used the bleeder passage 64 in the bolt 68 is not necessary.

Among the advantages of this invention may be mentioned the elimination of hum without the previous mechanical friction and without the insensitivity in the regulator resulting from such mechanical friction. The regulator described has been built to have a capacity of 50 to 3000 cubic feet per hour with a substantially constant delivery pressure. Its flow discharge characteristic is such that the change of delivery pressure from that of any setting over the entire flow range of 50 to 3000 cubic feet per hour is .10 to .12 pound per square inch. Its sensitivity at any delivery pressure over the flow range is .05 pound per square inch, which means that with the regulator operating at any setting in such range then on a shut-off of fluid and its return, the delivery pressure will return to within .05 of its value before the shut-off. In the construction illustrated the breaker regulator 27 reduced the gas pressure of oxygen from 300 pounds per square inch to 14 pounds per square inch and the main regulator illustrated reduced the pressure from 14 pounds to 8 pounds per square inch. Substantially identical or matched regulators were provided one for oxygen and one for acetylene, the acetylene regulator having no breaker or preliminary regulator since its initial pressure was not as high. The baffle plate 16 protects the diaphragm 13 from a surge of gas from the nozzle so that there is no danger of any velocity component of gas surge impinging upon the diaphragm 13 and effecting the accuracy of the regulator. The only difference in the matched regulators was that the oxygen regulator had a pressure relief valve that the acetylene regulator did not have. In the embodiment illustrated diaphragm seat 10 in both the main and pilot regulators was provided with perforations to enhance flexibility of the diaphragm valve seat. In the pilot regulator no such hum suppressor was found necessary because of the small amount of gas passed through the pilot regulator and the bleeder openings. It is only where the volume of gas is much larger than that which passes from the pilot regulator that hum needs to be eliminated. In the main regulator it was found that jump and creep varies from ⅞ pound per square inch to 2½ pounds per square inch as the flow varied between 50 and 3000 cubic feet per hour.

This invention provides a cushioning chamber contiguous and below the diaphragm to suppress hum in the diaphragm. From the drawing it may be seen that this chamber above the plate 16 is at least several times wider than its axial length, the effective diameter of this chamber is at least equal to that of the diaphragm and the diameter of this cushioning chamber is about sixteen times its axial depth. This invention is the first to provide a self-aligning valve in combination with a diaphragm cushioning chamber in a regulator for the purpose of suppressing vibration or hum in the diaphragm and valve.

By the term "self-aligning valve" is meant one having a sealing surface which is substantially effortlessly free to become parallel to its mating sealing surface when those sealing surfaces are moved into contact, irrespective of axial or other slight misalignment between them. No claim is made herein to such self-aligning valve per se. Such a valve of the type herein disclosed is claimed by prior application Ser. No. 700,692, filed October 2, 1946, for "Fluid Pressure Regulator," now Patent Number 2,612,728, dated October 7, 1952.

We claim:

1. In a self-aligning valve of the type having a stationary nozzle, a flexible diaphragm seat clamped around its outer edge portion for cooperation with said nozzle, a stem passing through said nozzle, secured to and guided by said diaphragm seat, said seat being provided with a perforate portion between its nozzle engaging portion and clamped edge portion, and a flexible diaphragm responsive to fluid pressure for moving said valve stem, the combination therewith of the improvement for eliminating hum, said improvement comprising a stationary baffle forming a sealed edge chamber between said pressure responsive diaphragm and nozzle with said pressure responsive diaphragm constituting a wall of said chamber, and laterally shiftable packing having a freely sliding fit around said stem where it passes through said baffle, said packing being a washer of smooth material surrounding said stem, a housing enclosing said washer, walls of said housing engaging the opposite faces of said washer loosely to allow lateral shifting of said washer with said stem and allow restricted movement of gas through said baffle whereby said chamber functions as cushion to eliminate humming movement of said stem and flexible diaphragm seat.

2. A valve according to claim 1 in which said washer is of smooth flexible material from the class containing polyethylene and polytetrafluoro-ethylene resins.

3. A regulator having a main valve according to claim 1 and in which the pressure responsive diaphragm is controlled by a pilot regulator within a casing enclosing said regulator, a bleeder passage through said pressure responsive diaphragm having a constriction therein greater than any constriction in gas flow through said baffle and through and around said smooth washer and stem.

4. In a regulator having a casing, a self-aligning type valve in said casing, a fluid supply passage in said casing leading to said valve, a fluid outlet passage in said casing leading from said valve, a stationary nozzle constituting one element of said valve, a flexible diaphragm type valve seat constituting another and movable valve element for cooperation with said nozzle and clamped adjacent its periphery to said casing, a pressure responsive flexible diaphragm clamped in said casing for actuating said valve, and a tiltable valve stem carried by said seat diaphragm and extending through said nozzle for cooperation with said pressure responsive diaphragm, the combination therewith of the improvement for reducing any tendency for said pressure responsive diaphragm and valve to hum while maintaining its self-aligning character by retaining the ability for said stem to tilt slightly, said improvement including a stationary plate gas tightly sealed with respect to said pressure responsive diaphragm, adjacent its periphery, located between that diaphragm and said valve, and a housing in said plate around said stem where it passes through said plate, a packing washer around said stem and within said housing, said washer and housing being of cooperating sizes to allow free lateral shifting of the washer in said housing with any tilting of said stem and yet provide a restricted bleeder opening for movement of fluid out of a space between said plate and pressure responsive diaphragm whereby such space may function as a cushioning chamber to damp vibrations of said pressure responsive diaphragm.

5. A regulator according to claim 4 in which a passage for fluid under pressure leads to said casing on the side of said pressure responsive diaphragm opposite said plate, and said pressure responsive diaphragm is provided with a restricted bleeder opening of smaller size than that through said housing, whereby a pilot regulator may control the supply of fluid pressure to said casing and said first mentioned regulator may be controlled by a pilot regulator.

6. A regulator according to claim 4 in which said plate is substantially as wide as said pressure responsive diaphragm and the depth of said cushioning chamber is but a small minor fraction of its width.

7. A combination according to claim 6 in which said packing washer has a clearance around said stem and within the housing longitudinally of the stem of 5 to 10 thousandths of an inch.

8. In a regulator having a casing provided with an inlet passage, an outlet passage, a nozzle between said passages, a movable valve member controlling fluid movement through said nozzle, said valve member being an inner portion of a resilient diaphragm clamped to said casing adjacent its periphery, a valve closing spring cooperating with said valve member diaphragm for moving the same toward said nozzle, a pressure responsive diaphragm spaced from said valve member diaphragm, a stem of smaller cross sectional area than that of said nozzle extending through said nozzle and between said diaphragms and loosely abutting one of said diaphragms, spaced from the inside of said nozzle, and being yieldably supported and guided by the other of said diaphragms without any rigid guide bearing for said stem for opening said valve member diaphragm by flexing it away from said nozzle under flexure of the pressure responsive diaphragm whereby said stem may tilt slightly as the valve member diaphragm closes against said nozzle, creep is reduced and sensitivity enhanced by the absence of any rigid guide bearing for the stem, and a stationary wall in said casing between said diaphragms and through which said stem passes, the combination therewith of the improvement enabling said stem to pass through said stationary wall and retain its ability to tilt without there being excessive clearance between said stem and wall, said improvement including laterally shiftable packing slidably embracing a portion of said stem and slidably engaging the adjacent portion of said stationary wall.

9. A regulator according to claim 8 in which said shiftable packing is of a type having a smooth surface contiguous said rod and smooth surfaces which contact any portion of said stationary wall to offer only small friction with movement of the rod through the shiftable packing and to reduce friction on lateral movement of said packing with respect to said stationary wall.

10. A regulator comprising in combination a casing, inlet and outlet passages, a valve between said passages, a diaphragm dividing said casing into an upper loading chamber and a lower valve chamber and generally responsive to outlet pressure, means whereby said diaphragm may be loaded, a valve stem between said diaphragm and valve, and a wall in said casing between said diaphragm and valve and spaced from said diaphragm and through which said stem passes, said upper chamber being closed to the atmosphere and having a passage leading thereto from the inlet passage, said diaphragm and wall around said stem being each provided with constricted openings and the smaller of them being that in said diaphragm.

WILGOT J. JACOBSSON.
EDWARD BEHNKE.

References Cited in the file of this patent

UNITED STATES PATENTS

| Number | Name | Date |
| --- | --- | --- |
| 1,679,826 | Jenkins | Aug. 7, 1928 |
| 1,709,905 | Farmer | Apr. 23, 1929 |
| 1,891,547 | Krichbaum | Dec. 20, 1932 |
| 1,925,323 | Hopkins | Sept. 5, 1933 |
| 2,119,473 | Smith | May 31, 1938 |
| 2,305,975 | McKinley | Dec. 22, 1942 |
| 2,394,243 | Joyce | July 23, 1942 |